(12) United States Patent
Schoenefeld et al.

(10) Patent No.: US 10,717,165 B2
(45) Date of Patent: Jul. 21, 2020

(54) SURFACE MACHINING DEVICE

(71) Applicant: Notion Systems GmbH, Schwetzingen (DE)

(72) Inventors: Jan Schoenefeld, Leimen (DE); Jens Muenkel, Hockenheim (DE); Michael Doran, Dossenheim (DE); Carsten Schimansky, Sinsheim (DE)

(73) Assignee: Notion Systems GmbH, Schwetzingen (DE)

( * ) Notice: Subject to any disclaimer, the term of this patent is extended or adjusted under 35 U.S.C. 154(b) by 595 days.

(21) Appl. No.: 14/769,403

(22) PCT Filed: Feb. 19, 2014

(86) PCT No.: PCT/EP2014/053247
§ 371 (c)(1),
(2) Date: Aug. 20, 2015

(87) PCT Pub. No.: WO2014/128170
PCT Pub. Date: Aug. 28, 2014

(65) Prior Publication Data
US 2016/0001412 A1  Jan. 7, 2016

(30) Foreign Application Priority Data
Feb. 20, 2013  (DE) .................. 10 2013 101 693

(51) Int. Cl.
*B23Q 17/22* (2006.01)
*B41J 25/00* (2006.01)
(Continued)

(52) U.S. Cl.
CPC ......... *B23Q 17/2266* (2013.01); *B23Q 7/003* (2013.01); *B23Q 15/26* (2013.01);
(Continued)

(58) Field of Classification Search
CPC ...... B23Q 17/2266; B23Q 7/03; B23Q 15/26; B41J 3/28; B41J 25/03; G05B 19/418; G05B 2219/40066
See application file for complete search history.

(56) References Cited

U.S. PATENT DOCUMENTS 4,712,114 A * 12/1987 Kikuchi ................ B65C 9/1865
101/288
5,738,564 A    4/1998 Helle et al.
(Continued)

FOREIGN PATENT DOCUMENTS

CN    101177073 A    5/2008
CN    101214884 A    7/2008
(Continued)

OTHER PUBLICATIONS

International Preliminary Report on Patentability dated Sep. 3, 2015 11 pages.
(Continued)

*Primary Examiner* — Santosh R Poudel
(74) *Attorney, Agent, or Firm* — Calderone Bullock LLC

(57) ABSTRACT

The invention relates to a surface machining device comprising a substrate support for receiving a substrate to be machined, a machining unit which can be moved relative to the substrate support along a first and a second movement axis, a position detecting unit for ascertaining the orientation of the substrate, and a control unit for controlling the movement of the machining unit dependent on the orientation of the substrate on the substrate support. The aim of the invention is to provide a surface machining device which can be produced in a compact manner and which allows a precise machining of the surface of the substrate to be machined in an inexpensive manner regardless of the position of the substrate on the substrate support. This is achieved in that the machining unit can be pivoted relative (Continued)

to the substrate support, in particular about a height axis which extends perpendicularly to the plane formed by the first and second movement axis.

24 Claims, 5 Drawing Sheets

(51) Int. Cl.
*B41J 3/28* (2006.01)
*B23Q 7/00* (2006.01)
*B23Q 15/26* (2006.01)
*G05B 19/418* (2006.01)

(52) U.S. Cl.
CPC ............. *B41J 3/28* (2013.01); *B41J 25/003* (2013.01); *G05B 19/418* (2013.01); *G05B 2219/40066* (2013.01)

(56) References Cited

U.S. PATENT DOCUMENTS

| | | | |
|---|---|---|---|
| 7,738,261 B2 | 6/2010 | Sekiya | |
| 7,819,055 B2 | 10/2010 | Tezuka et al. | |
| 7,901,036 B2 | 3/2011 | Won | |
| 2001/0003871 A1* | 6/2001 | Patton | B41J 2/01 33/18.1 |
| 2005/0253915 A1 | 11/2005 | Matsumoto et al. | |
| 2006/0037989 A1* | 2/2006 | Zilkenat | B21B 39/02 226/92 |
| 2006/0092219 A1 | 5/2006 | Kurita et al. | |
| 2007/0206038 A1* | 9/2007 | Baker | B41J 11/004 347/8 |
| 2007/0236535 A1* | 10/2007 | Baker | B41J 2/1721 347/36 |
| 2008/0117238 A1 | 5/2008 | Sekiya | |
| 2010/0177143 A1 | 7/2010 | Heimgartner | |
| 2010/0194813 A1* | 8/2010 | Kritchman | B41J 29/38 347/16 |
| 2010/0279081 A1* | 11/2010 | Koele | B41J 2/2132 428/195.1 |
| 2011/0199409 A1 | 8/2011 | Lee et al. | |
| 2011/0235065 A1 | 9/2011 | Wilson et al. | |
| 2012/0251689 A1* | 10/2012 | Batchelder | A23G 1/0056 426/383 |
| 2013/0066812 A1* | 3/2013 | Nehme | B29C 67/0088 705/400 |
| 2013/0078073 A1* | 3/2013 | Comb | F16H 19/06 414/749.1 |
| 2014/0373888 A1* | 12/2014 | Boukai | H01L 35/32 136/200 |

FOREIGN PATENT DOCUMENTS

| | | |
|---|---|---|
| CN | 201092148 Y | 7/2008 |
| CN | 101434145 A | 5/2009 |
| CN | 202727607 U | 2/2013 |
| DE | 4242906 C2 | 6/1994 |
| DE | 19963863 B4 | 7/2001 |
| EP | 1839884 A1 | 10/2007 |
| JP | 2002-001936 A | 1/2002 |
| JP | 2005-324130 A | 11/2005 |
| JP | 2007-319858 A | 12/2007 |
| JP | 2011-167684 A | 9/2011 |
| JP | 2012-509598 A | 4/2012 |
| WO | WO 2008/151453 A1 | 12/2008 |
| WO | WO 2010/019985 A1 | 2/2010 |
| WO | WO 2010/059486 A1 | 5/2010 |

OTHER PUBLICATIONS

Chinese Examination Report dated May 30, 2016 in Application No. 201480009399.8 (counterpart of U.S. Appl. No. 14/769,403) (14 pages).
Chinese Office Action dated Jan. 19, 2017 in counterpart Chinese application No. 201480009399.8 (English translation only) (6 pages).
International Search Report dated Jun. 27, 2014 4 pages.
European Office Action dated Mar. 20, 2017 in counterpart European application No. 14708499 (English translation only) (3 pages).
Japanese Office Action dated Jan. 9, 2018 in counterpart Japanese application No. 2015-558435 (English translation only) (7 pages).
Japanese Office Action (English Translation) dated Aug. 28, 2018 in Japanese Counterpart Application No. JP 2015-558435.

* cited by examiner

SURFACE MACHINING DEVICE

BACKGROUND OF THE INVENTION

Field of the Invention

The invention relates to a surface machining device comprising a substrate support for receiving a substrate to be machined, a machining unit adjustable relative to the substrate support along a first and a second movement axis, a position detecting unit for ascertaining the orientation of the substrate and a control unit for controlling the movement of the machining unit depending on the orientation of the substrate on the substrate support.

Description of Related Art

Surface machining devices of the above type are known in various configurations from the prior art. They serve for machining the surface of one or multiple substrates arranged on a substrate support in a previously defined manner by means of a machining unit provided to that end. Here, the surface machining manner depends on the configuration of the machining unit which can basically be configured in an arbitrary manner. Thus, for example, a material can be applied on the surface of the substrate by the machining unit, wherein for example printing methods, in particular inkjet-printing methods, are used to that end. Further, it is possible to modify the surface of the substrate by removing material in a predefined manner, e.g. by means of a laser unit. A laser machining can also take the form of a laser exposure.

Besides the various possibilities for processing the surface of the substrate given by the configuration of the machining unit, the substrates to be machined can be of diverse nature as well. The planar substrates be machined are usually of technical nature, for example printed circuit boards, solar cells, OLEDs or electronic displays, which can also be configured flexibly. Construction materials such as tiles, glass sheet tiles, wood laminate or the like count among said substrates as well. Further, substrates having a three-dimensional form can be machined besides the planar substrates mentioned already. The limits in machining of three-dimensional substrates are determined only by the constructionally predefined distance between the machining unit and the substrate support.

In particular when printing substrates of technical nature, high demands are made regarding the accuracy of surface machining, which has to be realized at favorable cost due to the increasing attempts in miniaturization of construction parts with an increased performance at the same time. To achieve the high quality demanded in surface machining, the machining devices known from the prior art require arranging the substrate to be machined on the substrate support in an exactly predefined manner. However, this is only possible with a great expenditure in terms of time and technology and thus leads to high production costs, with slight deviations in positioning the substrate resulting in considerable quality losses already. In particular when simultaneously machining multiple substrates arranged on the substrate support, orientation of said substrates to one another is a particular challenge.

Surface machining devices known from the prior art provide the pivotability of the substrate support relative to the machining unit, which moreover itself may comprise a limited adjustability to carry out the surface machining demanded. However, the quality of the machining does not always meet the requirements. Furthermore, the pivotable arrangement of the substrate support has the disadvantage of the device requiring a substantially bigger construction space compared to stationary substrate supports due to the movement area to be made available to that end.

BRIEF SUMMARY OF THE INVENTION

It is the object of the invention to provide a surface machining device which can be produced in a compact manner and which allows in a cost-saving manner an exact surface machining of the substrates to be machined regardless of the position of the substrates on the substrate support.

Said object of the invention is achieved by a surface machining device having the features of claim 1. Advantageous embodiments of the invention are indicated in the dependent claims.

Besides the at least one substrate support for receiving one or multiple substrates to be machined, the surface machining device comprises a machining unit adjustable relative to the substrate support(s) along a first and a second movement axis. Here, the movement axes of the machining unit are essentially orthogonal to one another so that the machining unit can generally be moved into every position relative to the substrate support and the substrate arranged thereon by means of a generally freely-selectable combination of movements along the first and the second movement axis. In the scope of the invention, a "basically orthogonal" orientation of the movement axes, besides their preferred right-angled orientation to one another, is also present if said axes are arranged relative to one another in an angle between 75° and 105°, preferably 80°-100°, particularly preferred 85-95°. Here, the movement control of the movement unit is effected by means of a control unit in consideration of the surface machining to be effected as well as by means of the data collected by a position detecting unit, wherein the position detecting unit offers to determine the orientation of the substrate on the substrate support. By combining the control data, defined by the surface machining, and the position data, it is possible to adjust the machining unit relative the substrate by means of the control unit such that the surface machining is effected in the predefined manner. Here, the position detecting unit can generally be configured in an arbitrary manner. Particularly advantageous is the use of optical sensors, e.g. cameras, which allow an easy and contact-free detection of the orientation of one or multiple substrates on the substrate support with high precision.

The motion control of the machining unit is effected by the control unit in consideration of the position data of the substrate(s) as well as the control data, which describe the surface machining. For this, the displacement of the machining unit is effected along at least one movement axis by means of a first gantry drive. The gantry drive, which uses synchronized, motor-type drives for moving the machining unit along an axis, allows a particularly space-saving design as well as exact positioning of the machining unit relative to the substrate support.

The configuration of the surface machining unit allows to configure said unit in a particularly compact and space-saving design, wherein the surface machining of the substrates to be machined is effected with high precision. By means of the position-detecting unit and the combination of the data collected by it and the data provided for surface-machining within the control unit—which in principle can also be configured in any desired manner—an exact orientation of the substrates on the substrate support can be dispensed with, offering considerable savings of cost and time compared to conventional surface machining devices.

The configuration of the drive for displacing the machining unit along the second movement axis can generally be selected in any manner. Thus, for example, for displacing the machining unit along the second movement axis, it is possible to use belt drives or nut and spindle mechanisms in order to adjust the machining unit essentially orthogonally to the first movement axis. However, according to an advantageous further embodiment of the invention, it is provided that the machining unit can be adjusted along the second movement axis by means of a linear drive, in particular by means of a linear motor. Said Embodiment of the invention additionally improves the precision of the movement control of the machining unit. In addition, in particular the use of a linear motor allows configuring the surface machining unit in a particularly compact and low-maintenance manner. According to a further embodiment of the invention, the linear drive for displacing the machining unit along the second movement axis can be configured as a second gantry drive, wherein in this case the machining unit is arranged on two synchronized drives, each one arranged on one of the two linear guides running spaced to one another parallel to the second movement axis.

The displaceability of the machining unit along the first and the second movement axis generally allows machining any surface region of the substrate in the desired manner by means of the machining unit.

According to the invention it is provided that the machining unit can be pivoted relative to the substrate support, in particular about a height axis which extends perpendicularly to the plane formed by the first and second movement axis.

This offers an additional option of adjusting the machining unit, which can for example comprise a print head or a processing laser, relative to the substrate and one or multiple substrates arranged on the substrate support.

Further, a machining unit that is pivotable about a height axis running orthogonally to the plane formed by the first and the second movement axis can be realized in a particularly simple and cost-saving manner and allows adjusting the machining unit to the position of the substrate on the substrate support in a particularly simple manner. As a result, it is possible to realize the process machining traces on the surface of the substrate effected by the machining unit uniformly and in a particular high quality, wherein it is particularly possible to avoid grid steps otherwise possibly arising, when printing the substrate surface, due to the position of the substrate and the type of print on the substrate support. Said steps may develop if the substrate is to be printed in a line that does not run parallel to the first and/or the second movement axis, which however can be compensated by the pivotability.

According to another embodiment of the invention, the pivotability of the machining unit can also be configured such that the machining unit machines parts of the substrate that are not arranged directly vertical below the machining unit. Thus, such a pivotability, which can for example be obtained by a pivotability about a pivot axis running parallel to the first or the second movement axis as well as parallel to the plane formed by said axes, allows extending the machining area of the machining unit to areas that are not arranged directly below the machining unit. Here, the pivotability can generally be configured in any desired way, wherein by means of a bearing in the type of a ball head provided in an exemplary manner, the machining unit can generally be disposed relative to the substrate support in any desired way.

According to another embodiment of the invention, it is provided that the machining unit is supported at a carrying element running spaced from the second movement axis, particularly at a linear guide running parallel to the second movement axis. Said additional support of the machining unit, which is achieved by said further embodiment of the invention, allows improving the mechanical stability of the machining unit in a complementary manner. In particular in machining units having a high width, the load brought on by the machining unit can be evenly spread by the use of a carrying element, in particular by the use of a linear guide running parallel to the second movement axis. As a result, the precision of the machining unit can be improved in a complementary manner.

According to another embodiment of the invention, it is provided that the machining unit can be adjusted essentially orthogonal to the plane formed by the first and the second movement axis. According to said embodiment of the invention, the machining unit further comprises—besides the displaceability in the plane formed by the first and the second movement axis according to the invention—the option to be adjusted in its distance relative to the substrate support. Said embodiment of the invention allows adjusting the machining unit into an optimum distanced position for machining relative to the substrate to be machined. Said embodiment of the invention further allows a particularly exact machining of the surfaces of three-dimensional substrates, wherein the machining unit can always be positioned into an optimal distanced position to the surface of the substrate to be machined in this case as well, even if the distance of the surface of the substrate to the machining unit changes according to the shape thereof. The adjustment of the machining unit in orthogonal direction relative to the plane formed by the first and the second movement axis can generally be effected in any manner and allows positioning the machining unit in every position so that the distance to the substrate is adjusted.

Further, according to another embodiment of the invention, it is provided that a maintenance unit is arranged adjacent to the substrate support as well as in the movement area of the machining unit. If required, a further development of the invention of such type allows displacing the machining unit into a maintenance position in the assembled state, or positioning it in a maintenance unit, where the machining unit is cleaned automatically or can be cleaned manually. Said embodiment of the invention allows that the machining unit can remain on the surface machining device and that it can automatically be displaced into the maintenance unit at predetermined intervals or in the case of a contamination determined.

The configuration of the surface machining device according to the invention allows machining the substrates arranged on the substrate support in the predefined manner in a cost-efficient way. Adjusting the substrate support is not required for achieving the task underlying the invention. However, according to an advantageous further development of the invention, it is provided that the substrate support can be adjusted relative to the machining unit. The adjustability of the substrate support, which can be controlled for instance by means of the control unit as well, additionally allows realizing the surface machining by means of the machining unit with a high quality in a cost-efficient way. Thus, by means of the displaceability of the substrate support, the substrate(s) arranged on the substrate support can be adapted and aligned relative to the configuration of the machining unit in an optimum way. Here, the intended synchronization of the movement of the machining unit and the movements of the substrate support can be effected by means of the control unit in an optimum way.

When using multiple substrate supports, the latter can generally be controlled separately from one another. That means a synchronization of the substrate supports is eventually not required but can be realized is necessary.

Here, the adjustability of the substrate support relative to the machining unit can generally be realized in any desired way. Thus, for instance a configuration that can be inclined relative to the plane formed by the movement axes can be provided, particularly allowing an optimum surface machining of such surfaces, which—as this may be the case in three-dimensional substrates—run inclined to the plane formed by the first and the second movement axis. However, according to a particularly advantageous embodiment of the invention, it is provided that the substrate support can be pivoted about the height axis that runs perpendicularly to the plane formed by the first and the second movement axis. Said embodiment allows a simple correction of twisted substrate on the substrate support in particular for planar substrates, so that the surface machining can be effected in an optimum way.

The configuration of the substrate support can be selected in an arbitrary manner. Thus, the substrate support in its most simple configuration may be formed by a planar plate that is made of metal or synthetic material. According to a further embodiment of the invention, the substrate support may also comprise holding means to ensure a positioning of the substrate on the substrate support, which means may operate electro-statically or by means of a vacuum. Further, according to an advantageous further development of the invention, it is possible to configure the substrate support in a heatable manner, to set the substrates to be machined to the optimum operating temperature for surface machining.

According to a particularly advantageous embodiment of the invention, the substrate support comprises, however, a circulating conveyor belt for receiving the substrate, preferably having a movement direction parallel to the movement direction of the first gantry drive, with the conveyer belt advantageously being pivotable about the height axis according to a particularly advantageous embodiment of the invention. Said embodiment of the invention allows adjusting the substrate relative to the machining unit and displacing it into a optimum position for machining in a simple way. The use of a conveyor belt, which can also be heatable and/or be equipped with holding means that operate electrostatically and/or by means of a vacuum, allows configuring the entire surface machining device in a particularly space-saving manner despite the adjustability of the substrate relative to the machining unit, as an additional movement space of the substrate support can be omitted. Particularly advantageously, besides the pivotability of the conveyor belt about the height axis, said belt may also be adapted to be inclined. The conveyor belt itself can be manufactured from any material. Besides synthetic material, the conveyor belt may be made of a metal, in particular a stainless steel, as well.

The movement of the conveyor belt can be synchronized with the movement(s) of the gantry drive (s) by means of the control unit, in particular such that the relation of the velocities is at least sectionally sufficiently constant, which e.g. can be achieved by equal velocities. Particularly preferable, the synchronic movement can be selected by means of the control unit such that the machining unit is guided sufficiently parallel to a straight edge of the substrate, which allows realizing respectively parallel lines without grid steps.

The configuration of the machining unit for surface machining can, as aforementioned, generally be selected in any way. Thus, the machining unit can e.g. be equipped with a laser for surface machining. In a particularly advantageous configuration, the machining unit comprises, however, one, preferably multiple inkjet print heads, which, according to a particularly advantageous embodiment of the invention, are arranged as to be adjustable relative to one another. The use of one or multiple inkjet print heads in connection with the surface machining device according to the invention allows a cost-efficient and precise surface machining that can be effected by means of an inkjet print. Moreover, a particularly precise printing result can be achieved by the number of print heads comprising one or multiple nozzles as well as by means of their preferably provided interadjustability relative to one another.

The control unit can generally be used for the motion control of the machining unit, wherein the movement is effected depending on the orientation of the substrate on the substrate support as well as in consideration of the surface machining to be realized. Further, according to a further embodiment of the invention, in the case of a displaceable configuration of the substrate support the control unit can be used for motion control of the substrate support as well, with the control unit in particular synchronizing the motions of the machining unit with the movements of the substrate support depending on the surface machining intended so that an optimum result of the surface machining can be achieved. Separate control units can be omitted.

BRIEF DESCRIPTION OF THE SEVERAL VIEWS OF THE DRAWINGS

Exemplary embodiments of the invention are described in further detail with reference to the drawings in the following. The drawings show in.

DETAILED DESCRIPTION OF THE INVENTION

Different embodiments of surface machining devices 1—1*f* are schematically illustrated in FIGS. 1-9. Here, the functioning of the respective surface machining devices 1-1f can be taken from the illustrations.

Figure 1:
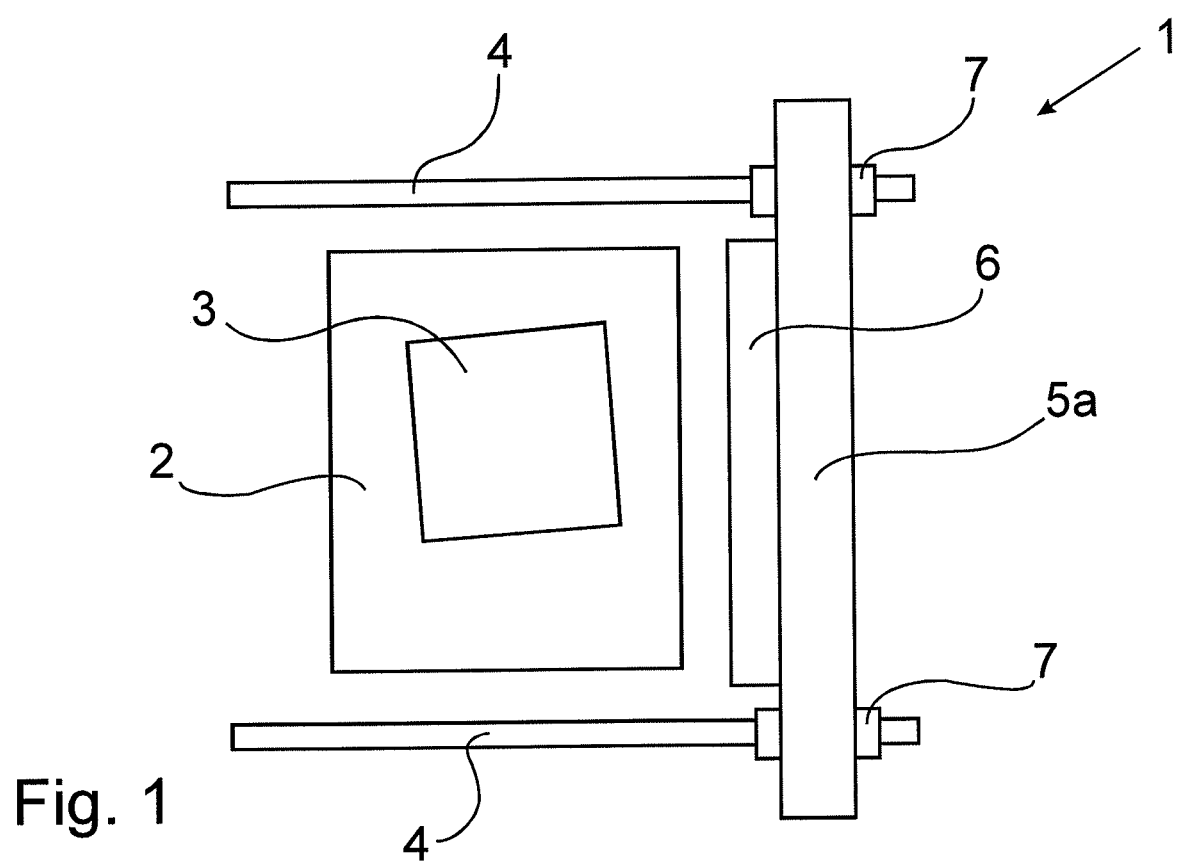
FIG. 1 a schematic illustration of a first surface machining device.

FIG. 1 shows a first embodiment of a surface machining device 1, in which a machining unit 6 can be adjusted relative to a substrate support 2 by means of a gantry drive 5a along two linear guides 4 in direction of the longitudinal axis of the linear guides 4. For displacing the machining unit 6, the gantry drive 5a comprises two feed motors 7 allowing a linear adjustment of the machining unit 6 along the linear guides 4 in a manner defined by a control unit (not shown).

The substrate support 2 serves for receiving a planar substrate 3 to be arranged thereon, the surface of which can be machined by means of the machining unit 6 in a predefined manner. To realize the predefined machining independently of the orientation of the substrate 3 on the substrate support 2, the surface machining device 1 comprises a position detection unit (not shown here) by means of which the exact position and orientation (twisting) of the substrate 3 on the substrate support 2 can be determined. In consideration of the position data collected by the position detecting unit as well as the surface machining to be effected, an adjustment of the machining unit 6 relative to the substrate support 2 is effected by the control unit (not shown here) so that the substrate 3 shows the desired surface design after machining.

Figure 2:
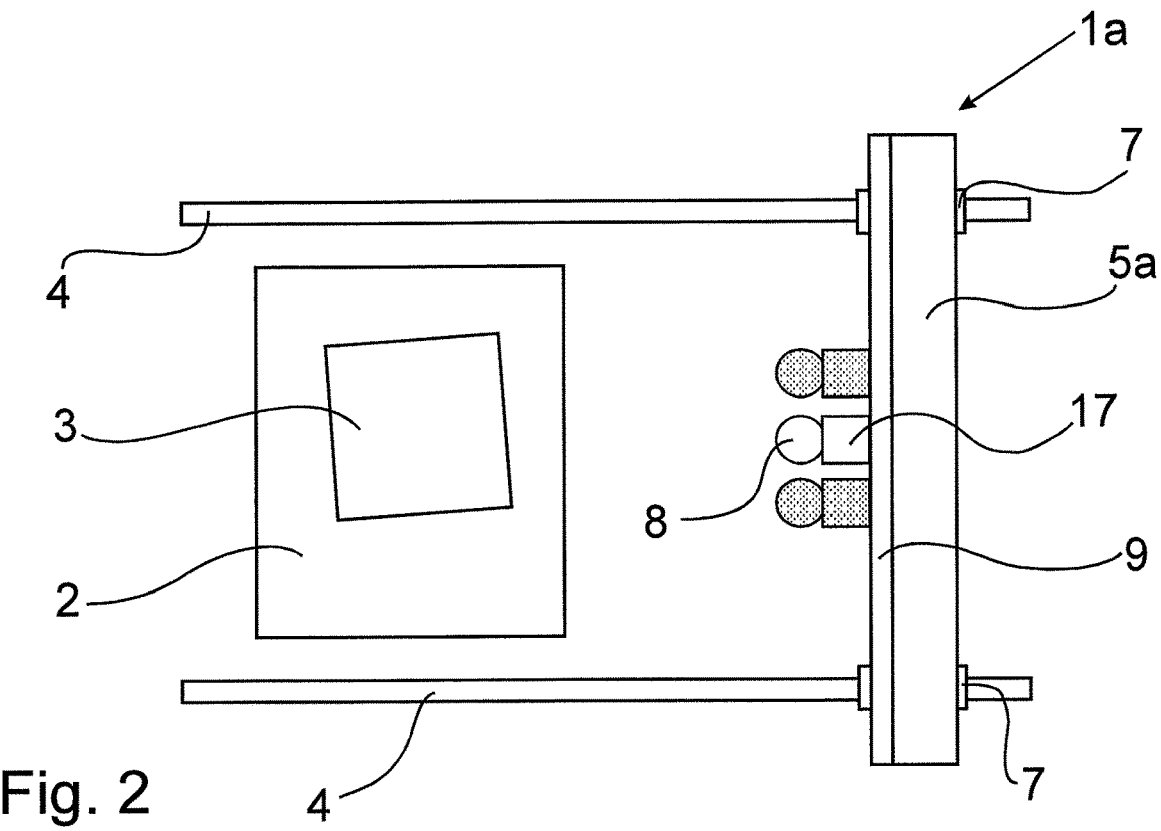
FIG. 2 a schematic illustration of a second embodiment of a surface machining device.
Figure 3:
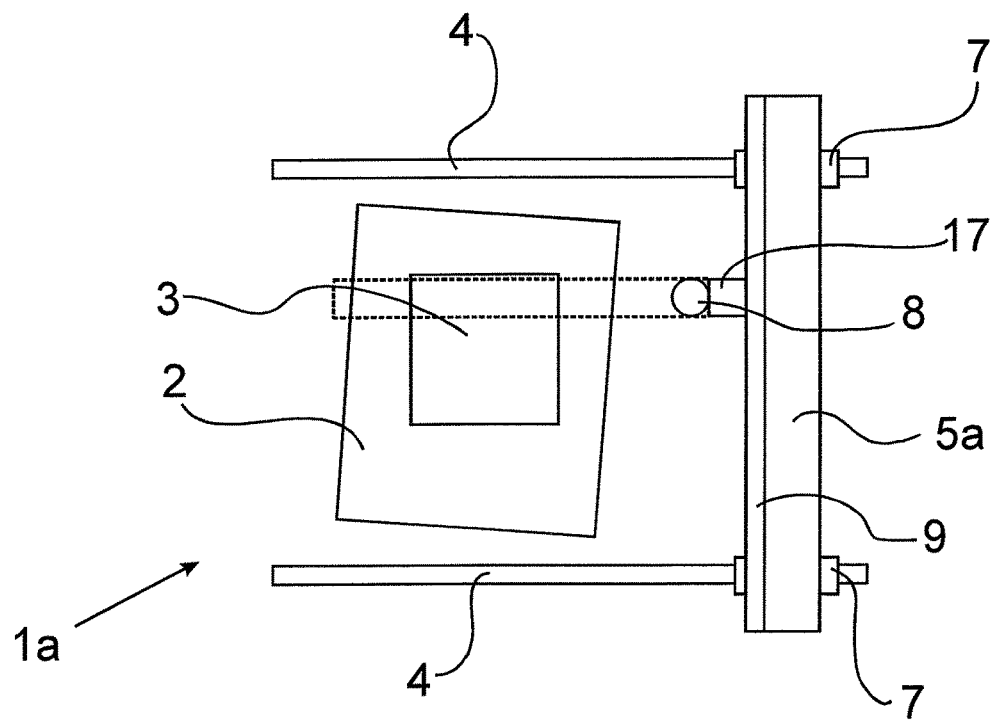
FIG. 3 a schematic illustration of the embodiment of the surface machining device in FIG. 2, showing an adjustment path of the print head.

The configuration of the machining unit 6 can generally be selected in an arbitrary manner, wherein said unit can e.g. comprise a laser or a dispenser or comprise a print head 8 as it is the case for the surface machining device 1a illustrated in FIGS. 2 and 3. The inkjet print head 8 is connected to the gantry drive 5a via a bearing block 17, wherein the bearing block 17 itself is arranged on a linear guide 9 and comprises a linear drive in the form of a feed motor, which allows an adjustment of the print head 8 essentially orthogonal to the first movement axis determined by the linear guides 4. In consideration of the position data of the substrate 3 on the substrate support 2 collected by the position detecting unit, a synchronization of the linear drive and the gantry drive 5a can be effected by the control unit so that the desired surface machining is realized by means of the print head 8 on the substrate 3. The configuration of the linear drive can be selected in an arbitrary manner, wherein said drive may also be configured as a gantry drive.

Figure 4:
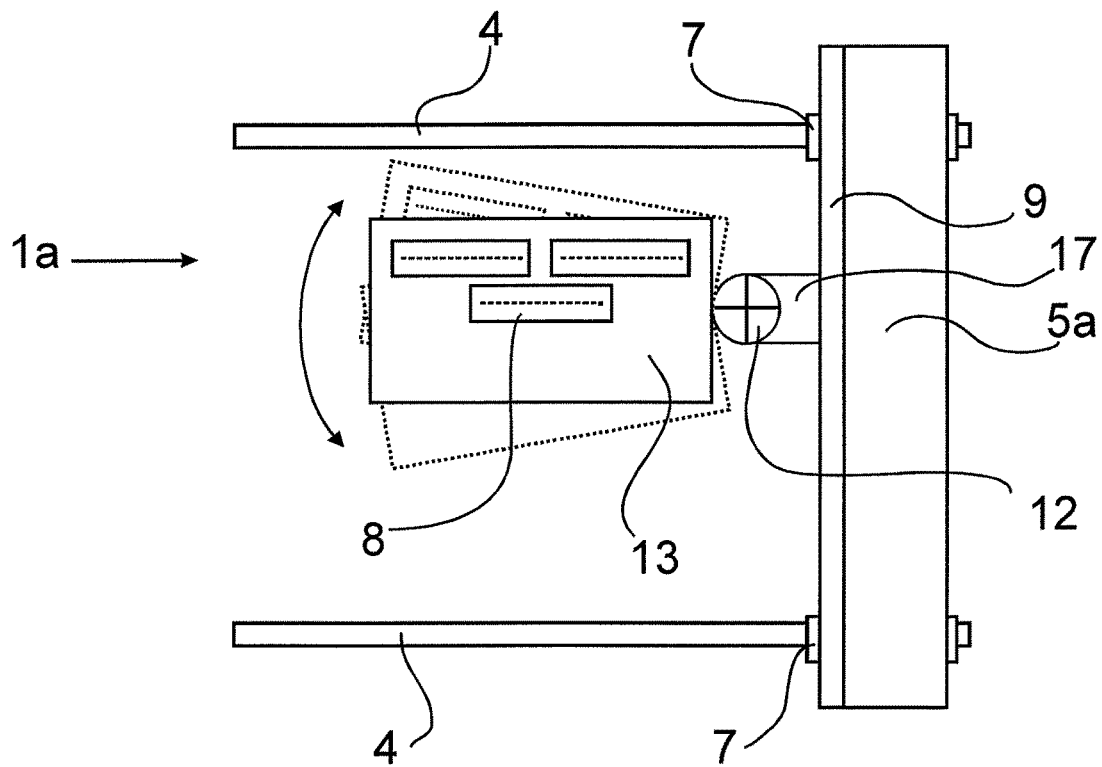
FIG. 4 a schematic illustration of the embodiment of the surface machining device in FIG. 2 having a machining unit that can be pivoted relative to the substrate support about a height axis that extends perpendicularly to the plane formed by the first and the second movement axis.

In the embodiment of the surface machining device 1c illustrated in FIG. 4, the print head receiving 13 is provided with three print heads 8. The print head receiving 13 can be pivoted by means of a pivoting drive 12. The pivoting drive 12 is connected to the linear guide 9 via the bearing block 17, which comprises a feed motor. The surface machining device 1a further allows—besides a displacement of the print head in accordance with the gantry drive 5a and the feed motor at the linear guide 9—pivoting the print head receiving 13 and therefore the print heads 8 about a height axis that runs perpendicular to a plane formed by the movement axes.

Figure 5:
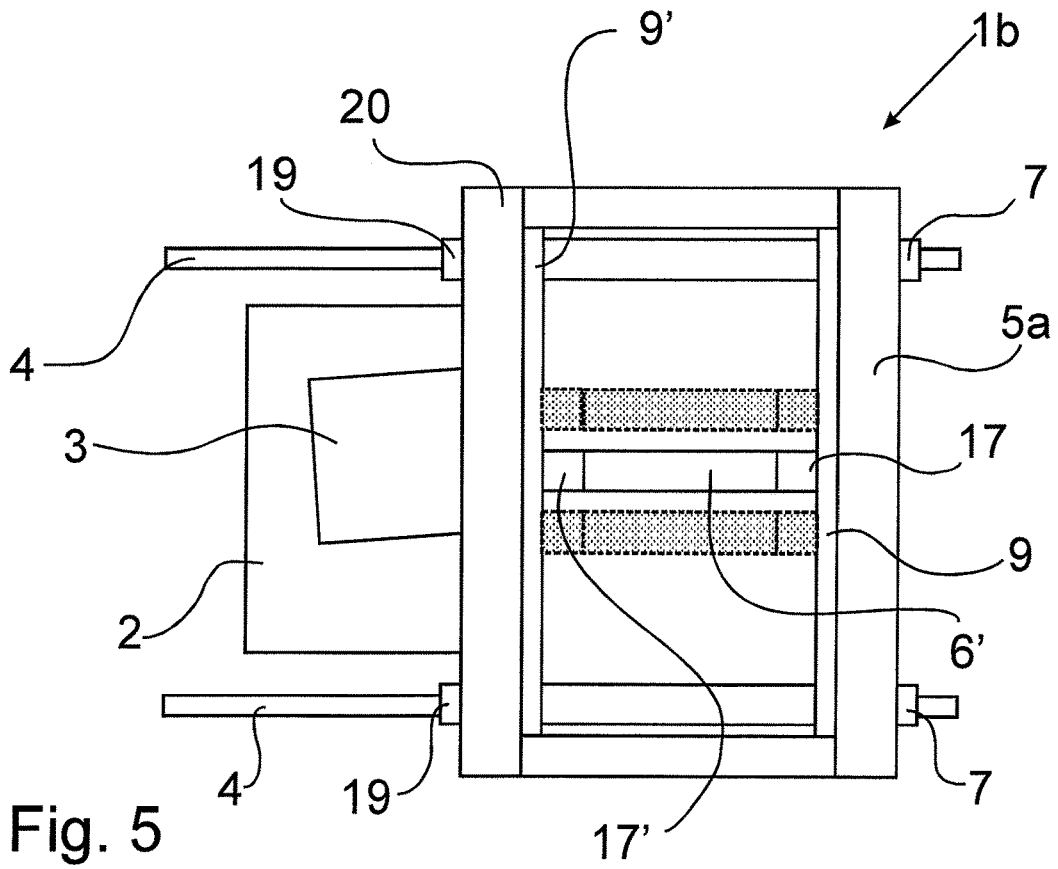
FIG. 5 a schematic illustration of a third embodiment of a surface machining device.

In a further configuration of the surface machining device 1b shown in FIG. 5, another linear guide 9' is arranged parallel to the first gantry drive 5a on a traverse 20 extending between the linear guides 4. A bearing block 17' is disposed on said linear guide 9' in a slidable manner for receiving the machining unit 6' so that a higher mechanical stability is given to a wide machining unit 6'. The loads involved can be spread evenly on the linear guides 4 supporting the gantry drive 5a and the traverse 20. A displacement of the machining unit 6' in direction of the longitudinal axis of the linear guides 9 and 9' is effected by means of a feed motor which is connected to the bearing block 17 of the linear guide 9.

Further, the height of the machining unit 6' can be adjusted between the bearing blocks 17, 17', so that the distance to the substrate can be set. The traverse 20 and the gantry drive 5a can be adjusted in direction of the longitudinal axes of the linear guides 4 by means of guiding elements 19 arranged on the linear guides 4 and extending as far as to the feed motors 7.

In another embodiment of the invention (not shown) of the surface machining device 1b, another feed motor is arranged at the bearing block 17', which motor forms a second gantry drive together with the first feed motor at the linear guide 9.

Figure 6:
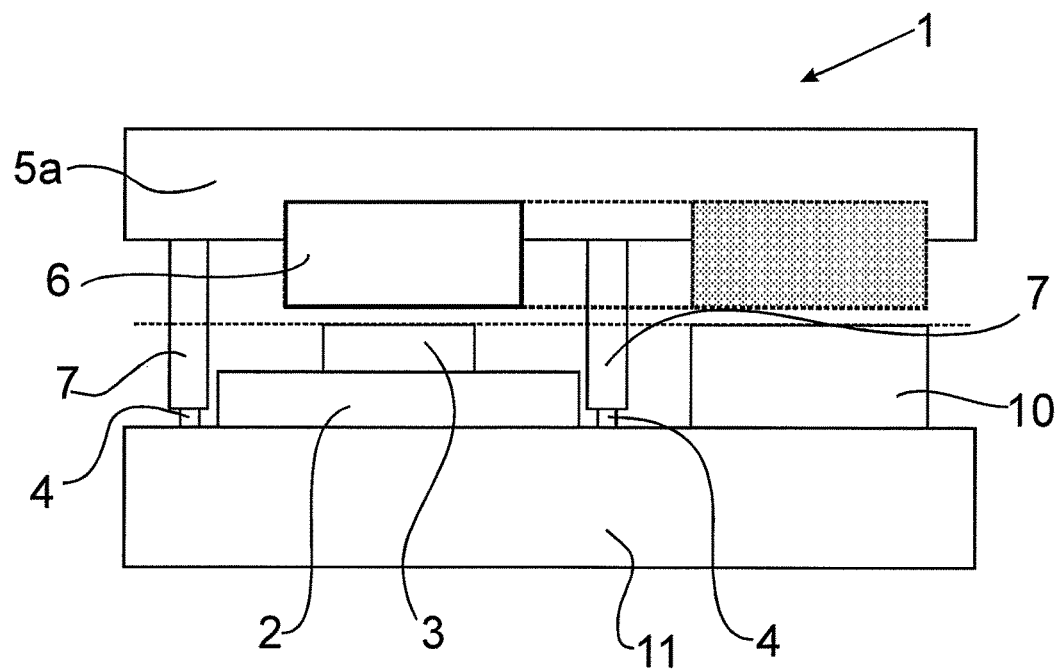
FIG. 6 a schematical side view of an embodiment of the surface machining device in FIG. 1 having an integral maintenance unit.

Besides the displaceability and the pivotability of the machining unit 6 relative to the substrate support 2, or to the substrate 3 arranged on the substrate support 2, the surface machining device 1 may further comprise a maintenance unit 10 arranged adjacent to the substrate support 2, which is arranged on a machine base 11 just like the substrate support 2 (See FIG. 6).

In case a maintenance of the machining unit 6 is required, said unit can be displaced by means of the existing adjustability from its machining position into a position where the machining unit 6 can be guided into the maintenance unit 10. Maintenance of the machining unit 6 can be effected at predefined intervals or after a contamination detected by a sensor, for example.

Figure 7:
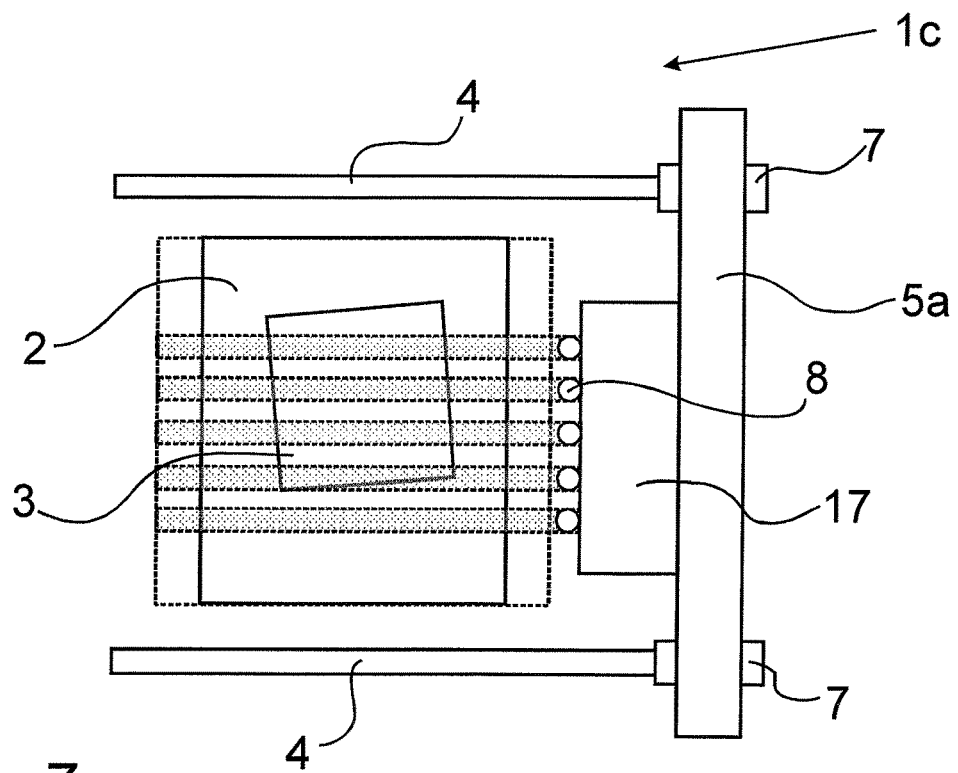
FIG. 7 a schematic illustration of a fifth embodiment of a surface machining device.
Figure 8:
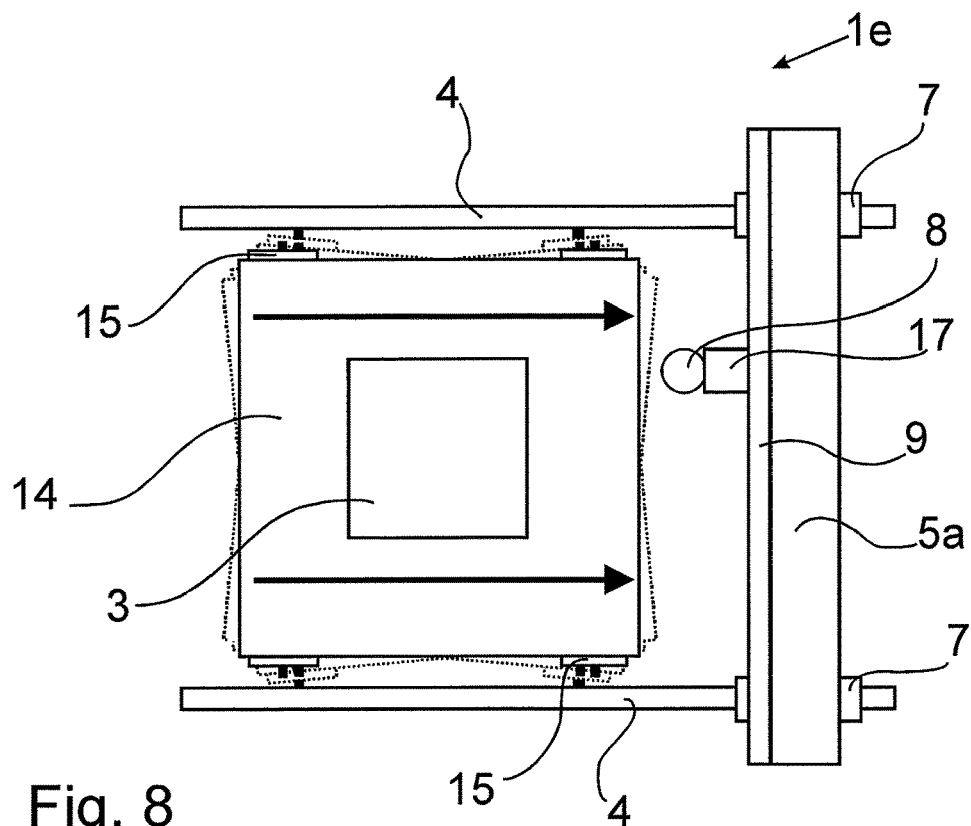
FIG. 8 a schematic illustration of a sixth embodiment of a surface machining device and FIG. 9 a schematic illustration of a seventh embodiment of a surface machining device.

In the surface machining device 1c illustrated in FIG. 7, it is further possible to adjust the substrate support 2 and thus the substrate 3 arranged thereon relative to the print heads 8. As illustrated in FIG. 8, the adjustability of the substrate support 2 is preferably realized by a conveyor belt 14 which allows an adjustability of the substrate 3 arranged on the conveyor belt 14 which allows an adjustability of the substrate 3 arranged on the conveyor belt 14 relative to the print head 8 by means of two rollers 15. Further, the conveyor belt 14 together with the rollers 15 can be pivoted about an axis extending perpendicularly to the surface of the conveyor belt 14, so that the substrate 3 can be twisted into an optimum position relative to the print head 8.

Figure 9:
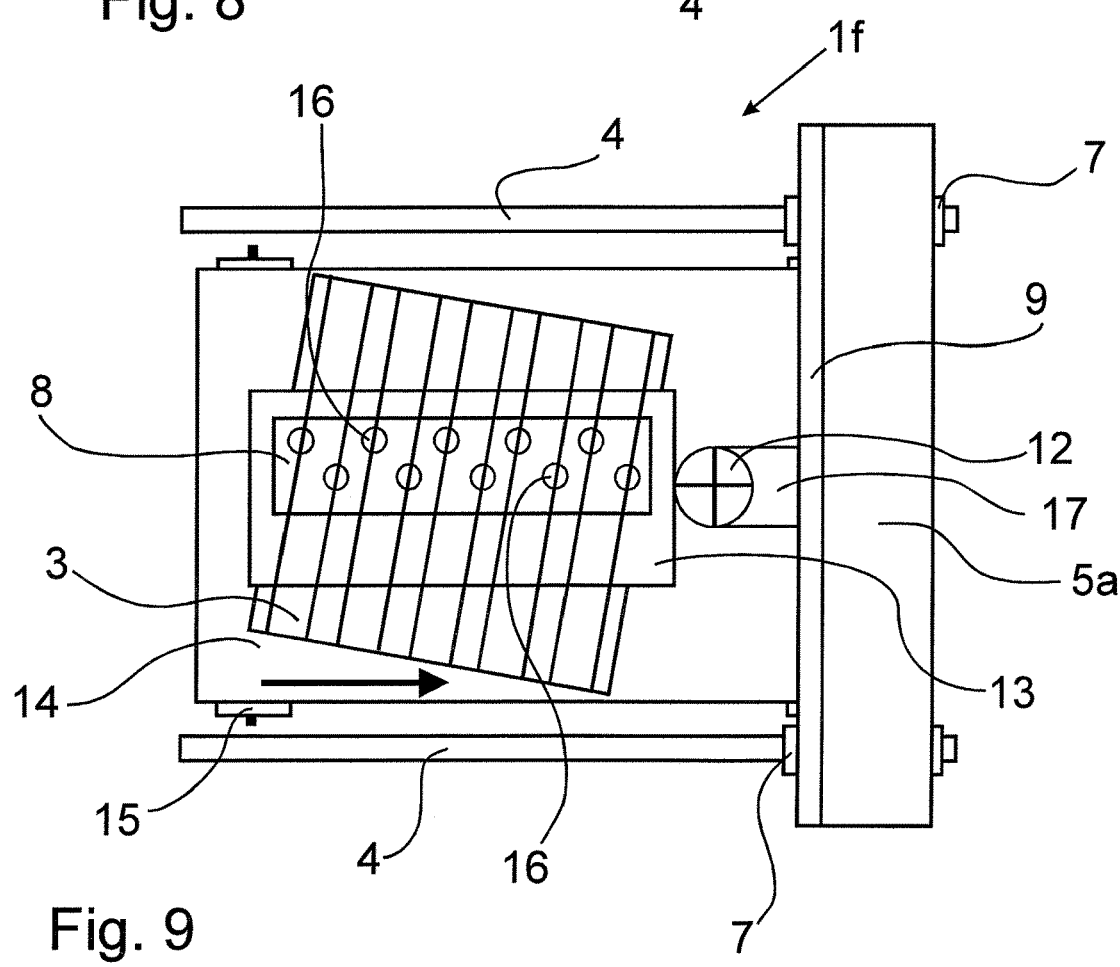

Further, in the illustrative embodiment of the surface machining device 1f illustrated in FIG. 9, the conveyor belt 14 is combined with a pivotable arrangement of the print head receiving 13, wherein the print head 8 used in the present case comprises a plurality of nozzles 16 being arranged to one another.

We claim:

1. A surface machining device, comprising
a substrate support for receiving a substrate to be machined,
a machining unit which can be adjusted relative to the substrate support along a first and a second movement axis, the movement axes essentially running orthogonal to one another and the machining unit being adjustable at least along the first movement axis by means of a first gantry drive,
a position detector sensor for ascertaining an orientation of a substrate on the substrate support, and
a control unit for controlling the movement of the machining unit depending on the orientation of the substrate on the substrate support;
wherein the machining unit is configured to pivot relative to the substrate support about a height axis which extends perpendicularly to a plane formed by the first and second movement axes;
wherein the substrate support comprises a circulating conveyor belt for receiving the substrate, wherein the conveyor belt is pivotable about the height axis, so that the substrate can be twisted into an optimum position relative to a print head, and wherein synchronization of the circulating conveyor belt and the first gantry drive is effected by the control unit.

2. The surface machining device according to claim 1, wherein the machining unit can be adjusted along the second movement axis by means of a linear drive.

3. The surface machining device according to claim 1, wherein the machining unit is supported on a carrying element running spaced from the second movement axis.

4. The surface machining device according to claim 1, wherein the machining unit can be adjusted essentially orthogonal to the plane formed by the first movement axis and the second movement axis.

5. The surface machining device according to claim 1, further comprising a maintenance unit for cleaning the machining unit, wherein the maintenance unit is arranged adjacent to the substrate support and in a movement area of the machining unit and the machining unit is moveable from a machining position into the maintenance unit for cleaning.

6. The surface machining device according to claim 1, wherein the substrate support can be adjusted relative to the machining unit.

7. The surface machining device according to claim 1, wherein the machining unit comprises one or more inkjet print heads.

8. The surface machining device according to claim 1, wherein the control unit can be used for motion control of the substrate support, including synchronizing the movements of the machining unit with the movements of the substrate support depending on the surface machining intended.

9. A surface machining device, comprising
a substrate support for receiving a substrate to be machined, the substrate support comprising a circulating conveyor belt for receiving the substrate, the conveyor belt having a corresponding movement direction parallel to the movement direction of a first gantry drive,
a machining unit which can be adjusted relative to the substrate support along a first and a second movement axis, the movement axes essentially running orthogonal to one another and the machining unit being adjustable at least along the first movement axis by means of the first gantry drive,
a position detector sensor for ascertaining an orientation of a substrate on the substrate support and
a control unit for controlling the movement of the machining unit depending on the orientation of the substrate on the substrate support, wherein synchronization of the circulating conveyor belt and the first gantry drive is effected by the control unit,
wherein the machining unit comprises one or more inkjet print heads which are housed in a print head receiving unit and the machining unit is configured to pivot relative to the substrate support about a height axis which extends perpendicularly to a plane formed by the first and second movement axes, whereby the pivoting is performed by a pivoting drive to the print head receiving unit.

10. The surface machining device according to claim 9, wherein machining unit can be adjusted along the second movement axis by means of a linear drive.

11. The surface machining device according to claim 10, wherein the machining unit is supported on a carrying element running spaced from the second movement axis.

12. The surface machining device according to claim 11, wherein the carrying element running spaced from the second movement axis is a linear guide running parallel to the second movement axis.

13. The surface machining device according to claim 10, wherein the linear drive comprises a feed motor.

14. The surface machining device according to claim 10, wherein the linear drive comprises a second gantry drive.

15. The surface machining device according to claim 9, wherein the machining unit is supported on a carrying element running spaced from the second movement axis.

16. The surface machining device according to claim 15, wherein the carrying element running spaced from the second movement axis is a linear guide running parallel to the second movement axis.

17. The surface machining device according to claim 9, wherein the machining unit can be adjusted essentially orthogonal to the plane formed by the first movement axis and the second movement axis.

18. The surface machining device according to claim 9, further comprising a maintenance unit for cleaning the machining unit, wherein the maintenance unit is arranged adjacent to the substrate support and in a movement area of the machining unit and the machining unit is moveable from a machining position into the maintenance unit for cleaning.

19. The surface machining device according to claim 9, wherein the substrate support can be adjusted relative to the machining unit.

20. The surface machining device according to claim 9, wherein the substrate support can be pivoted about the height axis running perpendicularly to the plane formed by the first and the second movement axis.

21. The surface machining device according to claim 9, wherein the conveyor belt is pivotable about the height axis.

22. The surface machining device according to claim 9, wherein the control unit can be used for motion control of the substrate support, including synchronizing the movements of the machining unit with the movements of the substrate support depending on the surface machining intended.

23. The surface machining device according to claim 9, wherein two or more of the inkjet print heads are arranged to be adjustable relative to one another.

24. A surface machining device, comprising
a substrate support for receiving a substrate to be machined,
a machining unit which can be adjusted relative to the substrate support along a first and a second movement axis, the movement axes essentially running orthogonal to one another and the machining unit being adjustable at least along the first movement axis by means of a first gantry drive,
a position detector sensor for ascertaining an orientation of a substrate on the substrate support, and
a control unit for controlling the movement of the machining unit depending on the orientation of the substrate on the substrate support;
wherein the machining unit is configured to pivot relative to the substrate support about a height axis which extends perpendicularly to a plane formed by the first and second movement axes;
wherein the substrate support comprises a circulating conveyor belt for receiving the substrate, wherein the conveyor belt is pivotable about the height axis, so that the substrate can be twisted into an optimum position relative to a print head, and wherein synchronization of the circulating conveyor belt and the first gantry drive is effected by the control unit such that the machining unit is guided sufficiently parallel to a straight edge of the substrate to allow for realization of respectively parallel lines without grid steps.

* * * * *